H. N. OTT & K. LEUCHSENRING.
NOSE PIECE FOR MICROSCOPES.
APPLICATION FILED JAN. 2, 1912.
1,023,390.
Patented Apr. 16, 1912.
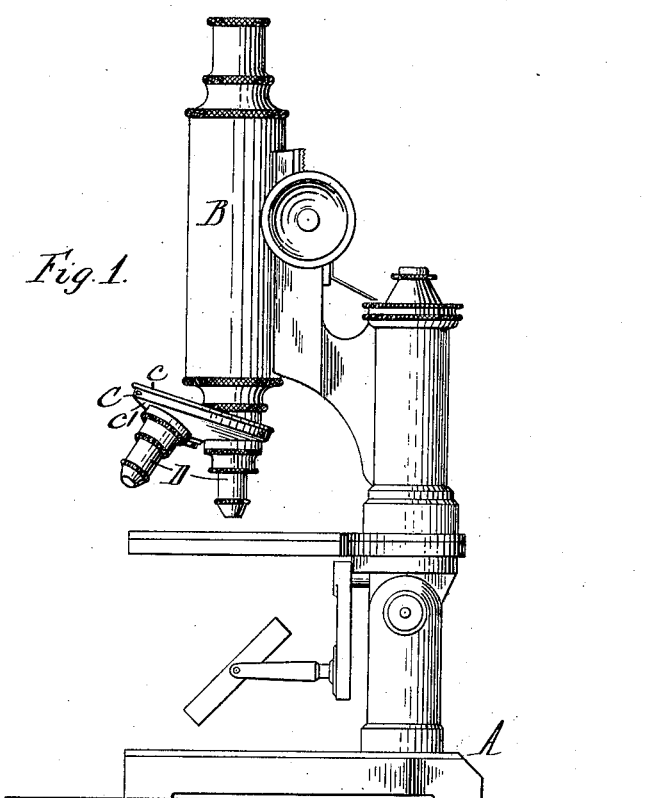
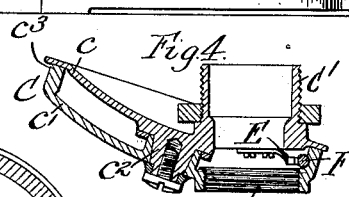
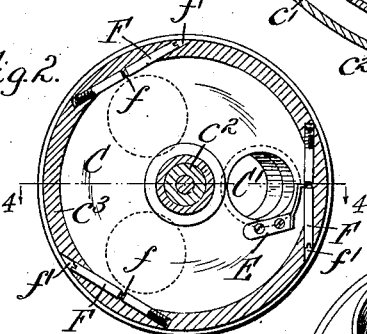
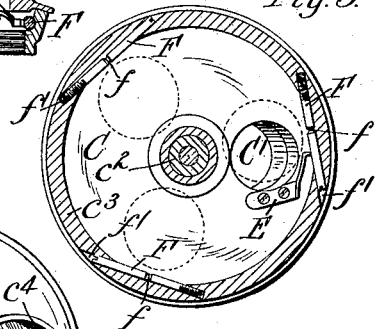
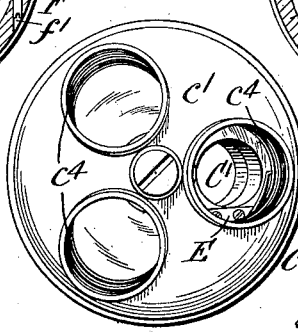
Witnesses:—
A. Borkenhagen
A. L. McGee
Inventor
Harvey N. Ott,
Konrad Leuchsenring,
By Wilhelm, Parker & Hard,
Attorneys

UNITED STATES PATENT OFFICE.

HARVEY N. OTT AND KONRAD LEUCHSENRING, OF BUFFALO, NEW YORK, ASSIGNORS TO SPENCER LENS COMPANY, OF BUFFALO, NEW YORK.

NOSE-PIECE FOR MICROSCOPES.

1,023,390.  Specification of Letters Patent.  Patented Apr. 16, 1912.

Application filed January 2, 1912. Serial No. 668,929.

*To all whom it may concern:*

Be it known that we, HARVEY N. OTT and KONRAD LEUCHSENRING, citizens of the United States, residing at Buffalo, in the county of Erie and State of New York, have invented a new and useful Improvement in Nose-Pieces for Microscopes, of which the following is a specification.

This invention relates to nose pieces for microscopes of that kind in which a plurality of different objectives are supported by a rotatable carrier so that any one of the objectives can be placed in position for use by turning the objective carrier. These nose pieces are provided with stops or devices which act to resist the movement of the objective carrier when any one of the objectives has been brought into the optical axis and to releasably hold the nose piece in this position. The devices heretofore used for this purpose must be made and fitted with great care in order to insure the requisite accuracy of position of the objectives, and much time and labor are required in assembling and adjusting the parts.

The objects of this invention are to provide stop devices for nose pieces which insure absolute accuracy of position of the objectives but nevertheless reduce the time and labor required in assembling and adjusting the parts of the nose piece; also to provide stop devices which can be quickly and easily adjusted as required to insure the correct positions of the several objectives; and also to produce stop devices which are of exceedingly simple and inexpensive construction and do not detract from the neat appearance of the nose piece.

In the accompanying drawing: Figure 1 is a side elevation of a microscope equipped with a nose piece embodying the invention. Fig. 2 is an inverted sectional plan, on an enlarged scale, of the nose piece detached. Fig. 3 is a similar view thereof, showing a different position of the objective carrier. Fig. 4 is a sectional elevation thereof in line 4—4, Fig. 2. Fig. 5 is a bottom plan view thereof.

Like reference characters refer to like parts in the several figures.

A represents a microscope stand of ordinary construction, B the lens tube thereof, and C a nose piece provided with a plurality of objectives D. A triple nose piece having three objectives is illustrated in the drawings, but the invention is in no wise restricted to this number of objectives and the nose piece can have any desired number of objectives.

The nose piece, except with respect to the stop or holding devices for positioning and releasably retaining the objectives in position for use, may be of any suitable construction. It consists, as usual, of a member $c$ which is removably secured on the end of the lens tube B, and a member $c'$ which carries the objectives D and is mounted on the member $c$ so that it can be turned thereon about a central axis for placing one or another of the objectives in line with the lens tube. In the nose piece shown in the drawings the supporting member $c$ consists of a concave disk having a screwthreaded nipple $C'$ by which it is screwed on the end of the lens tube, and the rotatable member $c'$ consists of a concave disk which is arranged to turn on a central stud $c^2$ projecting from the supporting member and is provided with an edge flange or rim $c^3$ bearing against the under side of the edge portion of the supporting disk and with threaded nipples or bosses $c^4$ for the attachment of the objectives.

E represents a detent or catch which is secured to the member $c$ of the nose piece and is adapted to spring into notches or grooves $f$ in a plurality of stop screws F which are adjustably secured in the rotatable member $c'$ of the nose piece. The number of the stop screws F employed depends upon the number of objectives carried by the nose piece, there being one screw for each objective. The catch or detent preferably consists, as shown, of a piece of spring metal located in the cavity of the nose piece and secured at one end to the member $c$ by screws, or otherwise, with its free end projecting toward the rim of the rotatable member $c'$ of the nose piece and adapted to snap into the grooves in the stop screws F. The stop screws F are screwed into substantially tangential holes $f'$ in the rim of the rotatable member of the nose piece so that the screws bear the relation of chords to the circular rim, and their intermediate portions are exposed in the cavity of the nose piece. The screws are threaded only at their inner ends, which screw into the threaded inner ends of the holes $f'$, so that the exposed portions of the screws are smooth except for the groove $f$. The screws are adapted to be turned by a screw driver inserted into the outer ends of the screw holes $f'$. Preferably the stop screws terminate within the screw holes so that there will not be any projections on the outer edge of the nose piece.

When the objective carrier is turned to place any desired objective in position for use, the free end of the detent E will engage and slide on the stop screw F for that objective until it snaps into the groove $f$ and resists further movement of the carrier. The objective will then be in correct position and will be retained in this position until the objective carrier is forcibly turned to place another objective in position for use. The positions of the grooves $f$ can be changed as may be necessary to insure absolute accuracy of position of the objectives by simply turning the stop screws by means of a small screw driver inserted in the outer ends of the screw holes $f'$. This can be done quickly and easily when adjusting the instrument at the factory, and after the stop screws are once properly adjusted they require no further adjustment.

We claim as our invention:

1. In a nose piece for microscopes, the combination with a rotatable member carrying objectives, and a member which supports said rotatable member, of stop screws adjustably secured on one of said members, and a catch carried by said other member and adapted to engage said stop screws for holding the objectives in position for use, substantially as set forth.

2. In a nose piece for microscopes, the combination with a rotatable member carrying objectives, and a member which supports said rotatable member, of a catch carried by one of said members, and stop devices which are arranged on said other member substantially perpendicular to radial lines extending from the stop devices to the axis of said rotatable member and have portions adapted to be engaged by said catch for holding said rotatable member in different positions, said stop devices being adjustable for changing the relative position of their catch engaging portions, substantially as set forth.

3. In a nose piece for microscopes, the combination with a rotatable member carrying objectives, and a member which supports said rotatable member, of a catch carried by one of said members, and stop screws which are arranged on said other member substantially perpendicular to radial lines extending from the stop screws to the axis of said rotatable member and have circumferential grooves in which said catch is adapted to engage for holding said rotatable member from turning, the relative position of said grooves being adapted to be changed by turning said stop screws, substantially as set forth.

4. In a nose piece for microscopes, the combination with a rotatable member carrying objectives and having a circular rim, and a member which supports said rotatable member, of a catch secured to said supporting member, and stop screws arranged in said rotatable member in the relation of chords to said circular rim, said stop screws having grooves for the engagement of said catch and being adapted to be turned for changing the relative position of said grooves, substantially as set forth.

Witness our hands this 5th day of December, 1911.

HARVEY N. OTT.
KONRAD LEUCHSENRING.

Witnesses:
 CORA FACKLAIN,
 LOUIS M. POTTER.

Copies of this patent may be obtained for five cents each, by addressing the "Commissioner of Patents, Washington, D. C."